US009812943B2

(12) United States Patent
Kondo (10) Patent No.: US 9,812,943 B2
(45) Date of Patent: Nov. 7, 2017

(54) RESONANT LOAD POWER CONVERSION DEVICE AND TIME DIVISION OPERATION METHOD FOR RESONANT LOAD POWER CONVERSION DEVICE

(71) Applicant: MEIDENSHA CORPORATION, Tokyo (JP)

(72) Inventor: Yasuhiro Kondo, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 15/318,796

(22) PCT Filed: Jun. 17, 2015

(86) PCT No.: PCT/JP2015/067430
§ 371 (c)(1),
(2) Date: Dec. 14, 2016

(87) PCT Pub. No.: WO2015/194585
PCT Pub. Date: Dec. 23, 2015

(65) Prior Publication Data
US 2017/0133920 A1    May 11, 2017

(30) Foreign Application Priority Data

Jun. 17, 2014  (JP) ................................ 2014-124135

(51) Int. Cl.
*H02M 1/00* (2006.01)
*H02M 1/088* (2006.01)
*H02M 7/537* (2006.01)

(52) U.S. Cl.
CPC ........... *H02M 1/088* (2013.01); *H02M 7/537* (2013.01)

(58) Field of Classification Search
CPC ......... H02M 1/088; H02M 2007/4815; H02M 3/33569; H02M 7/493; H02M 7/537
See application file for complete search history.

(56) References Cited

U.S. PATENT DOCUMENTS 6,278,314 B1 * 8/2001 Asplund .............. H02H 7/1206
                                                                327/427
6,842,355 B2    1/2005 Kleveland
(Continued)

FOREIGN PATENT DOCUMENTS

JP           55-8278 A       1/1980
JP          58-75481 A       5/1983
(Continued)

*Primary Examiner* — Adolf Berhane
*Assistant Examiner* — Henry Lee, III
(74) *Attorney, Agent, or Firm* — Foley & Lardner LLP (57) ABSTRACT

A resonant load power conversion apparatus is provided to lower a switching frequency of each switching device and to reduce the number of main circuit conductors. The conversion apparatus includes a single-phase inverter having a dc input side (Vdc) connected with a dc voltage source and an output side (Vout) connected with a resonant load and outputting a rectangular wave voltage with a resonance frequency. Upper and lower arms on the input side and output side of the single-phase inverter are connected, respectively, with switch group circuits 100U, 100V, 100V and 100V each of which includes N series combinations (N is an integer equal to or greater than 2) of two switching devices, connected in parallel with each other by main circuit conductors. The switching devices of the switch group circuits are controlled in a time division switching control mode with a control section.

6 Claims, 7 Drawing Sheets

GATE COMMAND SIGNAL GENERATION PATTERNS (56) References Cited

U.S. PATENT DOCUMENTS

| | | | |
|---|---|---|---|
| 7,499,290 B1* | 3/2009 | Mazzola | H02M 3/33569 363/17 |
| 2003/0179595 A1 | 9/2003 | Kleveland | |
| 2013/0176752 A1* | 7/2013 | Schelenz | H02M 1/088 363/17 |
| 2014/0098586 A1* | 4/2014 | Jeong | H02M 1/08 363/131 |
| 2016/0141963 A1* | 5/2016 | Bakran | H02M 3/156 363/21.01 |
| 2016/0241181 A1* | 8/2016 | Uemura | H02M 7/5387 |

FOREIGN PATENT DOCUMENTS

| | | |
|---|---|---|
| JP | 2001-309665 A | 11/2001 |
| JP | 2004-510400 A | 4/2004 |

* cited by examiner

FIG.1

INVERTER

FIG.3

(a) PATTERN (1)  (b) PATTERN (2)

(c) PATTERN (3)  (d) PATTERN (4)

(e) PATTERN (5)  (f) PATTERN (6)

PATHS OF OUTPUT CURRENT CORRESPONDING TO GATE COMMAND SIGNAL
GENERATION PATTERNS (1) - (6)

FIG.4

PATHS OF OUTPUT CURRENT CORRESPONDING TO GATE COMMAND SIGNAL GENERATION PATTERNS (7) - (12)

FIG.5

PRIOR ART

CIRCUIT CONFIGURATION OF AC/DC CONVERTER CONNECTED
WITH A RESONANT LOAD

FIG.6

PRIOR ART

CIRCUIT OF INVERTER IN A VARIATION EXAMPLE OF EARLIER TECHNOLOGY
(EXAMPLE OF 3 PARALLEL COMPONENTS)

FIG.8 PRIOR ART

PATHS OF OUTPUT CURRENT CORRESPONDING TO GATE COMMAND SIGNAL
GENERATION PATTERNS (1) - (6) IN A VARIATION EXAMPLE OF EARLIER TECHNOLOGY

RESONANT LOAD POWER CONVERSION DEVICE AND TIME DIVISION OPERATION METHOD FOR RESONANT LOAD POWER CONVERSION DEVICE

TECHNICAL FIELD

The present invention relates to a load resonance power conversion apparatus for supplying a voltage having a rectangular or square waveform to a resonant load such as an induction heating circuit.

BACKGROUND ART

Figure 5:
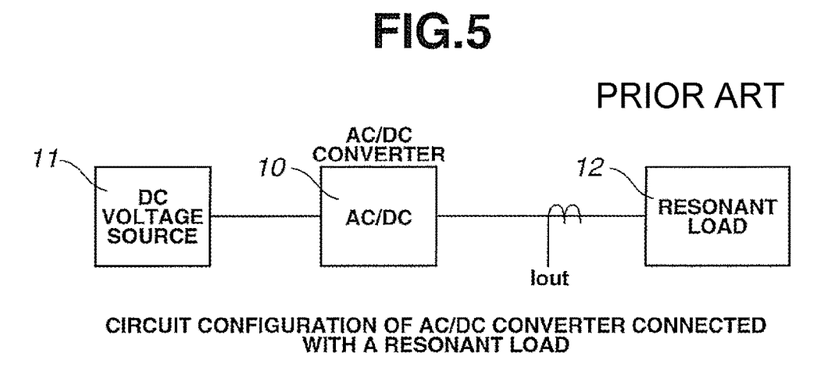
FIG. 5 is a block diagram showing a resonant load power conversion apparatus to which the present invention is applied.

FIG. 5 shows the circuit configuration of a load resonance power conversion apparatus (ac/dc conversion apparatus) connected with a resonant load. In FIG. 5, an ac/dc conversion apparatus or converter 10 is provided with a single-phase inverter having an input side connected with a dc voltage source 11, and an output side connected with a resonant load 12 such as an inductive heating circuit. The conversion apparatus 10 outputs a rectangular or square voltage at a resonance frequency to the resonant load 12 by on/off control of each switching device of the single-phase inverter.

In the case of the resonant load 12 being an induction heating circuit, this ac/dc conversion apparatus 10 is constructed as an induction heating load resonance ac/dc conversion apparatus (induction heating resonance type inverter).

This induction heating load resonance ac/dc conversion apparatus leads an alternating current produced by the on/off control of each switching device in the single-phase inverter, through a LC resonance circuit of coil and capacitor, applies the thus-generated alternating magnetic field to an object to be heated (electric conductor) thereby to produce eddy currents, and heats the object from the inside with the Joule heat generated in the object by the eddy currents.

In the induction heating circuit connected, as the resonant load, with the output side of the load resonance power conversion apparatus (the ac/dc conversion apparatus 10 of FIG. 5, for example), the depth of electric current penetration decreases as the frequency becomes higher, as is known from before.

In an electric resistance welded pipe joining (to produce a pipe or tube by joining a seam by electric resistance welding), to perform surface quenching, the load resonance ac/dc conversion apparatus is required to produce a voltage of a high frequency.

On the other hand, the switching devices in the load resonance ac/dc conversion apparatus used for the induction heating are unable to cope with voltage frequencies higher than the upper limit of drive frequency of the switching devices.

To solve this problem, a resonant load inverter system is proposed in a patent document 1, for example. As disclosed in FIG. 3 and described in this patent document, the parallel connection of N sections of series connected upper and lower switching devices makes it possible to drive the switching devices with 1/N cycle or period. Accordingly, for a desired resonance frequency, it is possible to decrease the drive frequency of the switching devices to a frequency inversely proportional to the number of parallel connected sections.

Figure 6:
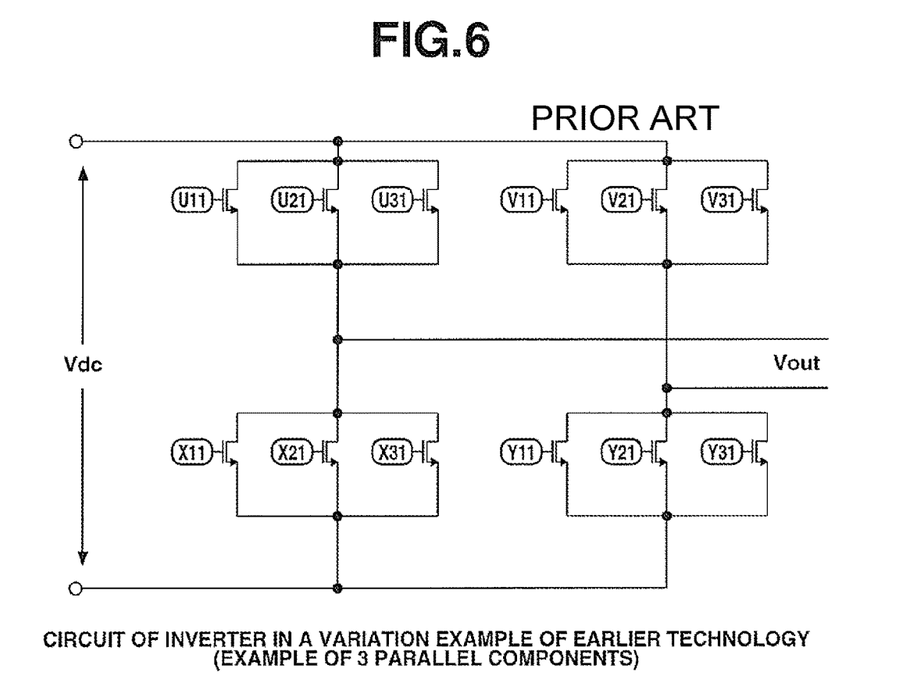
FIG. 6 is a circuit diagram showing an inverter section in a variation example conceivable from the resonant load inverter system of the patent document 1.

Moreover, a variation example of the resonant load inverter system of the patent document 1 is conceivable as shown in FIG. 6. In this variable example of FIG. 6, each arm of the single-phase inverter has an N parallel arrangement of switching devices (IGBT, for example).

The apparatus of FIG. 6 is a load resonance ac/dc conversion apparatus which can be used in the ac/dc conversion apparatus 10 of FIG. 5, for example. This apparatus includes a dc link voltage input section Vdc, a rectangular or square voltage output section Vout, and a single-phase inverter including N (three in this example) parallel connected switching devices (U11, U21, U31; V11, V21, V31; X11, X21, X31; and Y11, Y21, Y31) in each arm.

By increasing the number N of the switching devices connected in parallel in each arm as the example of FIG. 6, it is possible to decrease the switching frequency per one switching device as in the resonant load inverter system of the patent document 1.

Figure 7:
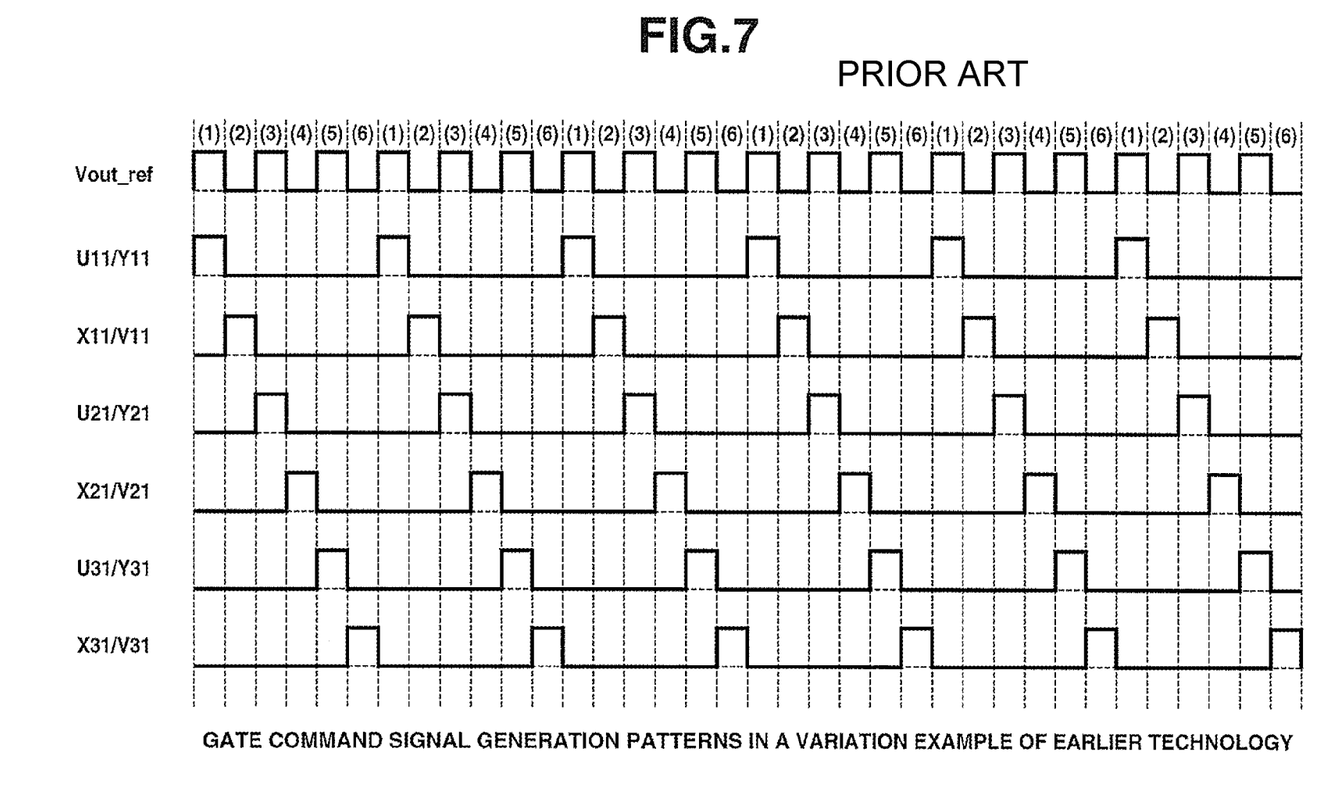
FIG. 7 is a signal waveform chart showing one example of gate command signal generation patterns for controlling the switching devices of the inverter section of FIG. 6.

Each of the switching devices of FIG. 6 is controlled between ON and OFF according to gate command signal generating patterns shown in FIG. 7.

The gate command signal generating patterns of FIG. 7 include a clock signal using, as trigger, ON, OFF changes of an output voltage command (Vout_ref) of the signal-phase inverter and following gate command signals which are periodical with a period or cycle period of 6 clocks or 6 clock intervals. A U11/Y11 gate command signal U11_gate/Y11_gate for the switching devices U11 and Y11 periodically outputs an ON signal for one clock and an OFF signal for five clocks. A X11/V11 gate command signal X11_gate/V11_gate for the switching devices X11 and V11 is delayed by one clock from the gate command signal U11_gate/Y11_gate but has the same on period and off period as the ON period and OFF period of the U11/Y11 gate command signal U11_gate/Y11_gate. A U21/Y21 gate command signal U21_gate/Y21_gate for the switching devices U21 and Y21 is delayed by one clock from the gate command signal X11_gate/V11_gate but has the same on period and off period as the ON period and OFF period of the gate command signal X11_gate/V11_gate. A X21/V21 gate command signal X21_gate/V21_gate for the switching devices X21 and V21 is delayed by one clock from the gate command signal U21_gate/Y21_gate but has the same on period and off period as the ON period and OFF period of the gate command signal U21_gate/Y21_gate. A U31/Y31 gate command signal U21_gate/Y21_gate for the switching devices U31 and Y31 is delayed by one clock from the gate command signal X21_gate/V21_gate but has the same on period and off period as the ON period and OFF period of the gate command signal X21_gate/V11_gate. A X31/V31 gate command signal X31_gate/V31_gate for the switching devices X31 and V31 is delayed by one clock from the gate command signal U31_gate/Y31_gate but has the same on period and off period as the ON period and OFF period of the gate command signal U31_gate/Y31_gate.

Figure 8:
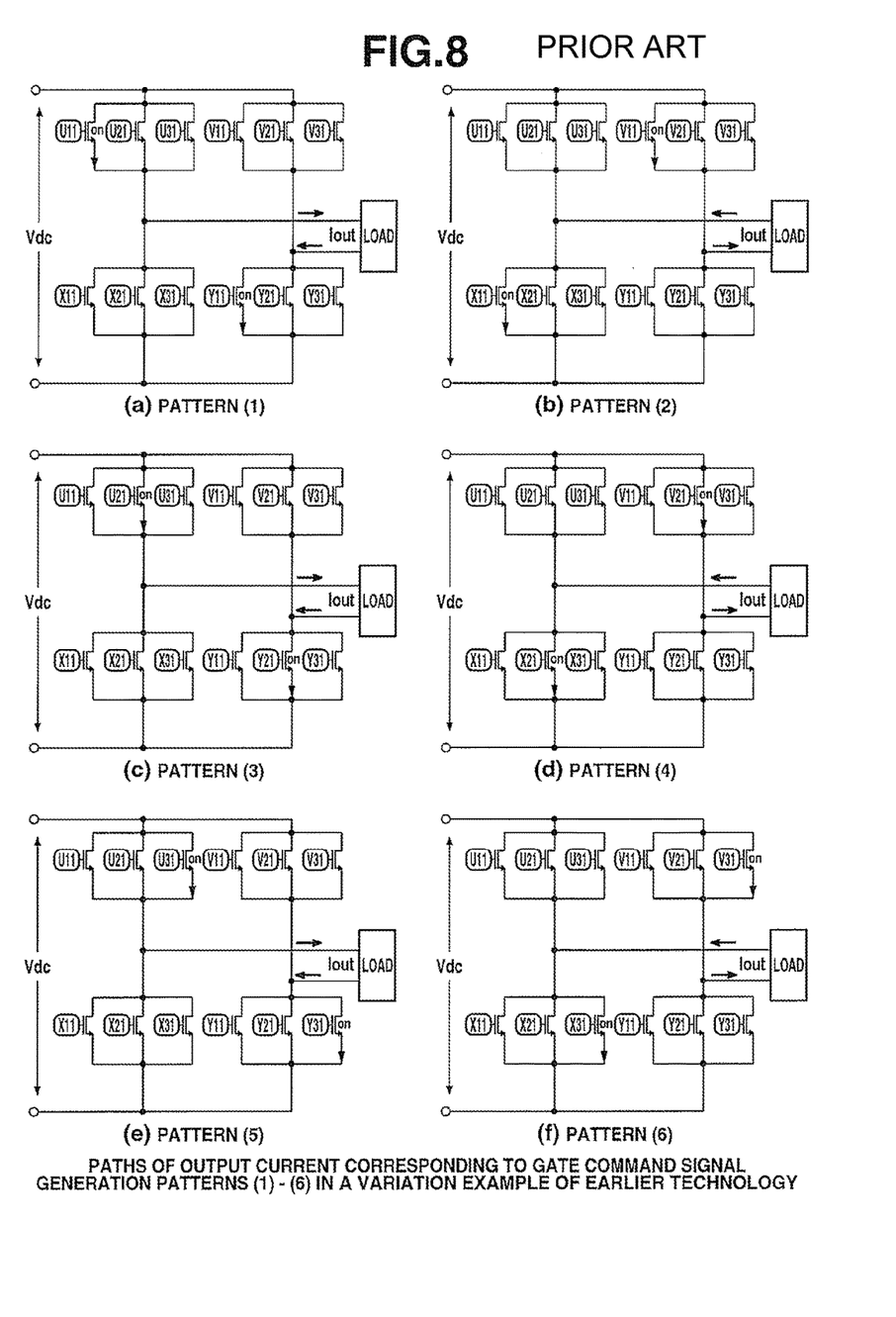
FIG. 8 is a view for illustrating on-controlled switching devices and output current path in gate command generation patterns (1)~(6) in FIG. 7.

Each of the switching devices of FIG. 6 is controlled between ON and OFF by one of the thus-produced gate command signals U11_gate/Y11_gate X31_gate/V31_gate in the manner of repetition of patterns (1)~(6) shown in FIG. 8(*a*) to FIG. 8(*f*).

FIG. 8 shows the output current when the switching devices of FIG. 6 are driven by the gate command signal generation patterns of FIG. 7.

FIGS. 8(*a*)~8(*f*) correspond to the patterns (1)~(6) of FIG. 7, respectively. In each figure, "ON" indicates the switching devices tuned ON by the ON signal of the gate command, and arrows indicate the path of output current Iout flowing through the ON controlled switching devices and the load.

As evident from FIGS. 7 and 8, the switching frequency (drive frequency) of the command for each switching device is decreased by (⅓) (1/N) by sequential switching operations of the patterns (1)~(6).

PRIOR ART DOCUMENT

Patent Document

Patent Document 1: JP2004-510400A

SUMMARY OF THE INVENTION

The switching frequency can be decreased by 1/N by the system of the patent document 1 and the circuit configuration shown in FIG. 8, as mentioned above. However, the pulse width or pulse duration of the gate command signals U11_gate/Y11_gate . . . X31_gate/V31_gate is not decreased by 1/N. Therefore, the upper limit of the output frequency is determined by the minimum pulse width based on the device characteristics due to the turn on rising time and the turn off falling time of each switching device.

Moreover, the circuit configuration of the system of the patent document 1 requires main circuit conductors connecting the switching devices among the single-phase inverters and the circuit configuration shown in FIG. 8 requires main circuit conductors connecting the switching devices in the single-phase inverter. The number of the main circuit conductors required by these circuit configurations is proportional to the parallel number N which is the number of connected components connected in parallel. Furthermore, the circuit configurations of the patent document 1 and FIG. 8 require the main circuit conductors equal in number to the switching devices, between the dc input section Vdc and the dc input side terminal of each switching device of the upper and lower arms and between the square wave voltage output section Vout and the output terminal of each switching device of the upper and lower arms (the number of the required main circuit conductors is equal to 4N=N parallel connected components× four arms). Accordingly, the cost and the space are increased by the main circuit conductors proportional, in number, to the number N of the parallel connected components.

Furthermore, the layout of the switching devices is expanded in proportion to the number of the switching devices. Accordingly, the main circuit conductors differ largely in their path lengths and hence the impedances of the main circuit conductors are dispersed widely. Consequently, the zero cross point of the current flowing through each main circuit component deviates and the loss is increased by an increase of the current flowing in an unillustrated snubber circuit connected with each switching device. Moreover, the increase of the snubber current might cause damage of the switching device.

Moreover, there is a demand for further decreasing the switching frequency per switching device.

The present invention has been devised to solve these problems. It is an object of the present invention to provide a power conversion apparatus for a resonant load and its time-division operating method, for lowering the switching frequency of each switching device and decreasing the number of main circuit conductors between the dc input section Vdc and the dc input side terminal of each switching device of the upper and lower arms and between the square wave voltage output section Vout and the output terminal of each switching device of the upper and lower arms.

To solve the above-mentioned problems, a resonant load power conversion apparatus, as recited in Claim 1, including a single-phase inverter having a dc input side to be connected with a dc voltage source and an output side to be connected with a resonant load and outputting a rectangular wave voltage with a resonance frequency, the resonant load power conversion apparatus comprises: switch group circuits which are connected, respectively, with upper and lower arms of one phase or a first phase of the single-phase inverter and upper and lower arms of the other phase or a second phase of the single-phase inverter, each of the switch group circuits including N series combinations, N being a number of the series combinations (N is an integer equal to or greater than 2), each of the series combinations being a series combination of M switching devices, M being a number of the switching devices (M is an integer equal to or greater than 2), the N series combinations being connected in parallel with each other by main circuit conductors; and a control section configured to control each of the switching devices of the switch group circuits of the single-phase inverter, by performing a switching control in a manner of time division by 1/(M×N).

A time division operating method, as claimed in Claim 3, is a time division operating method for a resonant load power conversion apparatus including a single-phase inverter having a dc input side connected with a dc voltage source and an output side connected with a resonant load and outputting a rectangular wave voltage with a resonance frequency, the resonant load power conversion apparatus comprising switch group circuits which are connected, respectively, with upper and lower arms of a first phase of the single-phase inverter and upper and lower arms of a second phase of the single-phase inverter, each of the switch group circuits including N series combinations, N being a number of the series combinations (N is an integer equal to or greater than 2), each of the series combinations being a series combination of M switching devices, M being a number of the switching devices (M is an integer equal to or greater than 2), the N series combinations being connected in parallel with each other by main circuit conductors, and the time division operating method as claimed Claim 3 comprises a control step of controlling each of the switching devices of the switch group circuits of the single-phase inverter, by performing a switching control in a manner of time division by 1/(M×N) with a control section.

With the above-mentioned configuration, it is possible to decrease the switching frequency of each switching device to a frequency inversely proportional to the product (M×N) of the series number M and the parallel number N.

Furthermore, it is possible reduce the number of main circuit conductors between the dc link voltage input section Vdc and the dc input terminals of the respective switching devices of the upper and lower arms, and between the rectangular wave voltage output section Vout and the output terminals of the respective switching devices of the upper and lower arms, to a number smaller than the number of the switching devices (M×N). Accordingly, it is possible to decrease the cost of the apparatus and decrease the space for installing the main circuit conductors.

Because of the series parallel connection of the switching devices in each switch group circuit, the arrangement of the switching devices is not enlarged as compared to the N parallel connection only of the earlier technology, and it is possible to reduce the dispersion of the impedance due to the dispersion of the lengths of the main circuit conductors.

Furthermore, in the resonant load power conversion apparatus, as claimed in Claim 2, the upper arm of the first phase of the single-phase inverter includes a parallel combination of a series combination of switching devices U11 and U12, a series combination of switching devices U21 and U22 and a series combination of switching devices U31 and U32, which are connected in parallel with each other by main circuit conductors, the lower arm of the first phase of the single-phase inverter includes a parallel combination of a series combination of switching devices X11 and X12, a series combination of switching devices X21 and X22 and a series combination of switching devices X31 and X32, the series combinations of the lower arm of the first phase being connected in parallel with each other by main circuit conductors, the upper arm of the second phase of the single-phase inverter includes a parallel combination of a series combination of switching devices V11 and V12, a series combination of switching devices V21 and V22 and a series combination of switching devices V31 and V32, the series combinations of the upper arm of the second phase being connected in parallel with each other by main circuit conductors, the lower arm of the second phase of the single-phase inverter includes a parallel combination of a series combination of switching devices Y11 and Y12, a series combination of switching devices Y21 and Y22 and a series combination of switching devices Y31 and Y32, the series combinations of the lower arm of the second phase being connected in parallel with each other by main circuit conductors, the control section includes a gate command generating section configured to generate, clocks using, as trigger, on and off changes of an output voltage command of the single-phase inverter, a first gate command signal for the switching devices U11 and Y11, the first gate command signal being periodic with a cycle period of a number of clocks equaling 2×2 (series number M)×3 (parallel number N), being set ON during an ON period of a number of clocks equaling {2 (series number M)×3 (parallel number N)}+1 and being set OFF during an OFF period of a number of clocks equaling {2 (series number M)×3 (parallel number N)}−1, a second gate command signal for the switching devices X11 and V11 delayed by one clock with respect to the first gate command signal for the switching devices U11 and Y11, and set to have an ON period equal to the ON period of the first gate command signal for the switching devices U11 and Y11, and an OFF period equal to the OFF period of the first gate command signal for the switching devices U11 and Y11, a third gate command signal for the switching devices U21 and Y21 delayed by one clock with respect to the second gate command signal for the switching devices X11 and V11, and set to have an ON period equal to the ON period of the second gate command signal for the switching devices X11 and V11, and an OFF period equal to the OFF period of the second gate command signal for the switching devices X11 and V11, a fourth gate command signal for the switching devices X21 and V21 delayed by one clock with respect to the third gate command signal for the switching devices U21 and Y21, and set to have an ON period equal to the ON period of the third gate command signal for the switching devices U21 and Y21, and an OFF period equal to the OFF period of the third gate command signal for the switching devices U21 and Y21, a fifth gate command signal for the switching devices U31 and Y31 delayed by one clock with respect to the fourth gate command signal for the switching devices X21 and V21, and set to have an ON period equal to the ON period of the fourth gate command signal for the switching devices X21 and V21, and an OFF period equal to the OFF period of the fourth gate command signal for the switching devices X21 and V21, a sixth gate command signal for the switching devices X31 and V31 delayed by one clock with respect to the fifth gate command signal for the switching devices U31 and Y31, and set to have an ON period equal to the ON period of the fifth gate command signal for the switching devices U31 and Y31, and an OFF period equal to the OFF period of the fifth gate command signal for the switching devices U31 and Y31, a seventh gate command signal for the switching devices U12 and Y12 delayed by one clock with respect to the sixth gate command signal for the switching devices X31 and V31, and set to have an ON period equal to the ON period of the sixth gate command signal for the switching devices X31 and V31, and an OFF period equal to the OFF period of the sixth gate command signal for the switching devices X31 and V31, an eighth gate command signal for the switching devices X12 and V12 delayed by one clock with respect to the seventh gate command signal for the switching devices U12 and Y12, and set to have an ON period equal to the ON period of the seventh gate command signal for the switching devices U12 and Y12, and an OFF period equal to the OFF period of the seventh gate command signal for the switching devices U12 and Y12, a ninth gate command signal for the switching devices U22 and Y22 delayed by one clock with respect to the eighth gate command signal for the switching devices X12 and V12, and set to have an ON period equal to the ON period of the eight gate command signal for the switching devices X12 and V12, and an OFF period equal to the OFF period of the eighth gate command signal for the switching devices X12 and V12, a tenth gate command signal for the switching device X22 and V22 delayed by one clock with respect to the ninth gate command signal for the switching devices U22 and Y22, and set to have an ON period equal to the ON period of the ninth gate command signal for the switching devices U22 and Y22, and an OFF period equal to the OFF period of the ninth gate command signal for the switching devices U22 and Y22, an eleventh gate command signal for the switching device U32 and Y32 delayed by one clock with respect to the tenth gate command signal for the switching devices X22 and V22, and set to have an ON period equal to the ON period of the tenth gate command signal for the switching devices X22 and V22 and an OFF period equal to the OFF period of the tenth gate command signal for the switching devices X22 and V22, and a twelfth gate command signal for the switching device X32 and V32 delayed by one clock with respect to the eleventh gate command signal for the switching devices U32 and Y32, and set to have an ON period equal to the ON period of the eleventh gate command signal for the switching devices U32 and Y32 and an OFF period equal to the OFF period of the eleventh gate command signal for the switching devices U32 and Y32, the control section being configured to control the switching devices with the gate command signals, respectively, between ON and OFF.

In the time division operating method, as claimed in Claim 4, the upper arm of the first phase of the single-phase inverter includes a parallel combination of a series combination of switching devices U11 and U12, a series combination of switching devices U21 and U22 and a series combination of switching devices U31 and U32, which are connected in parallel with each other by main circuit conductors, the lower arm of the first phase of the single-phase inverter includes a parallel combination of a series combination of switching devices X11 and X12, a series combination of switching devices X21 and X22 and a series combination of switching devices X31 and X32, the series combinations of the lower arm of the first phase being connected in parallel with each other by main circuit conductors, the upper arm of the second phase of the single-phase inverter includes a parallel combination of a series combination of switching devices V11 and V12, a series combination of switching devices V21 and V22 and a series combination of switching devices V31 and V32, the series combinations of the upper arm of the second phase being connected in parallel with each other by main circuit conductors, the lower arm of the second phase of the single-phase inverter includes a parallel combination of a series combination of switching devices Y11 and Y12, a series combination of switching devices Y21 and Y22 and a series combination of switching devices Y31 and Y32, the series combinations of the lower arm of the second phase being connected in parallel with each other by main circuit conductors, the control step comprises a gate command generating step of generating, clocks using, as trigger, on and off changes of an output voltage command of the single-phase inverter, a first gate command signal for the switching devices U11 and Y11, the first gate command signal being periodic with a cycle period of a number of clocks equaling 2×2 (series number M)×3 (parallel number N), being set ON during an ON period of a number of clocks equaling {2 (series number M)×3 (parallel number N)}+1 and being set OFF during an OFF period of a number of clocks equaling {2 (series number M)×3 (parallel number N)}−1, a second gate command signal for the switching devices X11 and V11 delayed by one clock with respect to the first gate command signal for the switching devices U11 and Y11, and set to have an ON period equal to the ON period of the first gate command signal for the switching devices U11 and Y11, and an OFF period equal to the OFF period of the first gate command signal for the switching devices U11 and Y11, a third gate command signal for the switching devices U21 and Y21 delayed by one clock with respect to the second gate command signal for the switching devices X11 and V11, and set to have an ON period equal to the ON period of the second gate command signal for the switching devices X11 and V11, and an OFF period equal to the OFF period of the second gate command signal for the switching devices X11 and V11, a fourth gate command signal for the switching devices X21 and V21 delayed by one clock with respect to the third gate command signal for the switching devices U21 and Y21, and set to have an ON period equal to the ON period of the third gate command signal for the switching devices U21 and Y21, and an OFF period equal to the OFF period of the third gate command signal for the switching devices U21 and Y21, a fifth gate command signal for the switching devices U31 and Y31 delayed by one dock with respect to the fourth gate command signal for the switching devices X21 and V21, and set to have an ON period equal to the ON period of the fourth gate command signal for the switching devices X21 and V21, and an OFF period equal to the OFF period of the fourth gate command signal for the switching devices X21 and V21, a sixth gate command signal for the switching devices X31 and V31 delayed by one clock with respect to the fifth gate command signal for the switching devices U31 and Y31, and set to have an ON period equal to the ON period of the fifth gate command signal for the switching devices U31 and Y31, and an OFF period equal to the OFF period of the fifth gate command signal for the switching devices U31 and Y31, a seventh gate command signal for the switching devices U12 and Y12 delayed by one clock with respect to the sixth gate command signal for the switching devices X31 and V31, and set to have an ON period equal to the ON period of the sixth gate command signal for the switching devices X31 and V31, and an OFF period equal to the OFF period of the sixth gate command signal for the switching devices X31 and V31, an eight gate command signal for the switching devices X12 and V12 delayed by one clock with respect to the seventh gate command signal for the switching devices U12 and Y12, and set to have an ON period equal to the ON period of the seventh gate command signal for the switching devices U12 and Y12, and an OFF period equal to the OFF period of the seventh gate command signal for the switching devices U12 and Y12, a ninth gate command signal for the switching devices U22 and Y22 delayed by one clock with respect to the eight gate command signal for the switching devices X12 and V12, and set to have an ON period equal to the ON period of the eight gate command signal for the switching devices X12 and V12, and an OFF period equal to the OFF period of the eighth gate command signal for the switching devices X12 and V12, a tenth gate command signal for the switching device X22 and V22 delayed by one clock with respect to the ninth gate command signal for the switching devices U22 and Y22, and set to have an ON period equal to the ON period of the ninth gate command signal for the switching devices U22 and Y22, and an OFF period equal to the OFF period of the ninth gate command signal for the switching devices U22 and Y22, an eleventh gate command signal for the switching device U32 and Y32 delayed by one clock with respect to the tenth gate command signal for the switching devices X22 and V22, and set to have an ON period equal to the ON period of the tenth gate command signal for the switching devices X22 and V22 and an OFF period equal to the OFF period of the tenth gate command signal for the switching devices X22 and V22, and a twelfth gate command signal for the switching device X32 and V32 delayed by one clock with respect to the eleventh gate command signal for the switching devices U32 and Y32, and set to have an ON period equal to the eleventh gate command signal for the ON period of the switching devices U32 and Y32 and an OFF period equal to the OFF period of the eleventh gate command signal for the switching devices U32 and Y32, the switching devices being controlled between ON and OFF, with the gate command signals, respectively.

With the above-mentioned configuration, it is possible to avoid the limitation on the output frequency by the limit of the minimum pulse width determined by the properties of the device because the on or off period during which each switching device is held on or off by the gate command signal produced by the gate command generating section is continuous for a plurality of clocks or a plurality of clock intervals.

(1) It is possible to lower the switching frequency of each switching device to a frequency inversely proportional to the product (M×N) of the series number M and the parallel number N according to the invention recited in one of Claims 1~4.

Furthermore, it is possible reduce the number of main circuit conductors between the dc link voltage input section Vdc and the dc input terminals of the respective switching devices of the upper and lower arms, and between the rectangular wave voltage output section Vout and the output terminals of the respective switching devices of the upper and lower arms, to a number smaller than M×N. Accordingly, it is possible to decrease the cost of the apparatus and decrease the space for installing the main circuit conductors.

Because of the series parallel connection of the switching devices in each switch group circuit, the arrangement of the switching devices is not enlarged as compared to the connection of the earlier technology, and it is possible to reduce the dispersion of the impedance due to the dispersion of the lengths of the main circuit conductors.

(2) It is possible to avoid the limitation on the output frequency by the limit of the minimum pulse width determined by the properties of the device according to the invention recited in Claim 2 or 4 because the on or off period during which each switching device is held on or off by the gate command signal produced by the gate command generating section is continuous for a plurality of clocks or a plurality of clock intervals.

MODE(S) FOR CARRYING OUT THE INVENTION

Figure 1:
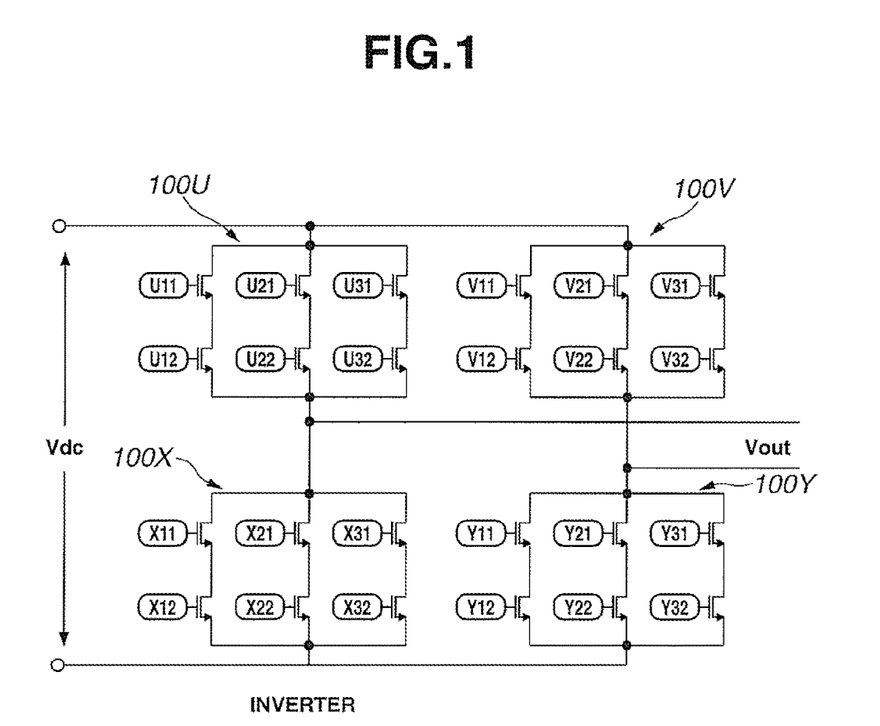
FIG. 1 is a block diagram of a single-phase inverter of a practical example according to an embodiment of the present invention.

Although embodiment or embodiments of the present invention is explained hereinbelow with reference to the drawings, the present invention is not limited to the following embodiment. FIG. 1 shows the configuration of a single-phase inverter section according to an embodiment of the present invention. This single-phase inverter can be used as the ac/dc conversion apparatus 10 (power converter for a resonant load) of FIG. 5, for example.

A dc input section of the single-phase inverter of FIG. 1 is connected with a dc link voltage input section Vdc. Switch group circuits 100U, 100V, 100X and 100Y are connected, respectively, in arms of the single-phase inverter. Each of the switch group circuits includes switching devices (IGBT, for example) arranged in a M series N parallel array (2 series 3 parallel in the example of FIG. 1). A rectangular or square wave output voltage Vout is outputted from between a common connection point of the switch group circuits 100U and 100X and a common connection point of the switch group circuit 100V and 100Y.

The switch group circuit 100U of the upper arm of one phase or first phase of the single-phase inverter includes a parallel arrangement of a series combination of switching devices U11 and U12, a series combination of switching devices U21 and U22 and a series combination of switching devices U31 and U32. These series combinations of the upper arm of the first phase are connected in parallel with ether other by main circuit conductors of the upper arm of the first phase.

The switch group circuit 100X of the lower arm of the first phase of the single-phase inverter includes a parallel arrangement of a series combination of switching devices X11 and X12, a series combination of switching devices X21 and X22 and a series combination of switching devices X31 and X32. These series combinations of the lower arm of the first phase are connected in parallel with ether other by main circuit conductors of the lower arm of the first phase.

The switch group circuit 100V of the upper arm of the other phase or second phase of the single-phase inverter includes a parallel arrangement of a series combination of switching devices V11 and V12, a series combination of switching devices V21 and V22 and a series combination of switching devices V31 and V32. These series combinations of the upper arm of the second phase are connected in parallel with ether other by main circuit conductors of the upper arm of the second phase.

The switch group circuit 100Y of the lower arm of the other phase or second phase of the single-phase inverter includes a parallel arrangement of a series combination of switching devices Y11 and Y12, a series combination of switching devices Y21 and Y22 and a series combination of switching devices Y31 and Y32. These series combinations of the lower arm of the second phase are connected in parallel with ether other by main circuit conductors of the lower arm of the second phase.

Each of the series combinations is in the form of a module having a 2-in-1 structure, and the two switching devices of each series combination are connected with each other inside the module.

In the single-phase inverter shown in FIG. 1, the switching devices of each of the switch group circuits are connected in the form of a series parallel circuit, as mentioned before. Therefore, it is possible to reduce the number of main circuit conductors connected, respectively, between the dc link voltage input section Vdc and the dc input terminals of the switching devices of each of the upper and lower arms and between the rectangular wave voltage output section Vout and the output terminals of the switching devices of each of the upper and lower arms, to a number smaller than the number of the switching devices (M×N). Moreover, because of the series parallel connection of the switching devices, the space for installing the main circuit conductors is not enlarged in proportion to the number of the switching devices (M×N) and it is possible to reduce the dispersion or unevenness of the impedances due to the unevenness of the path lengths of the main circuit conductors.

Figure 2:
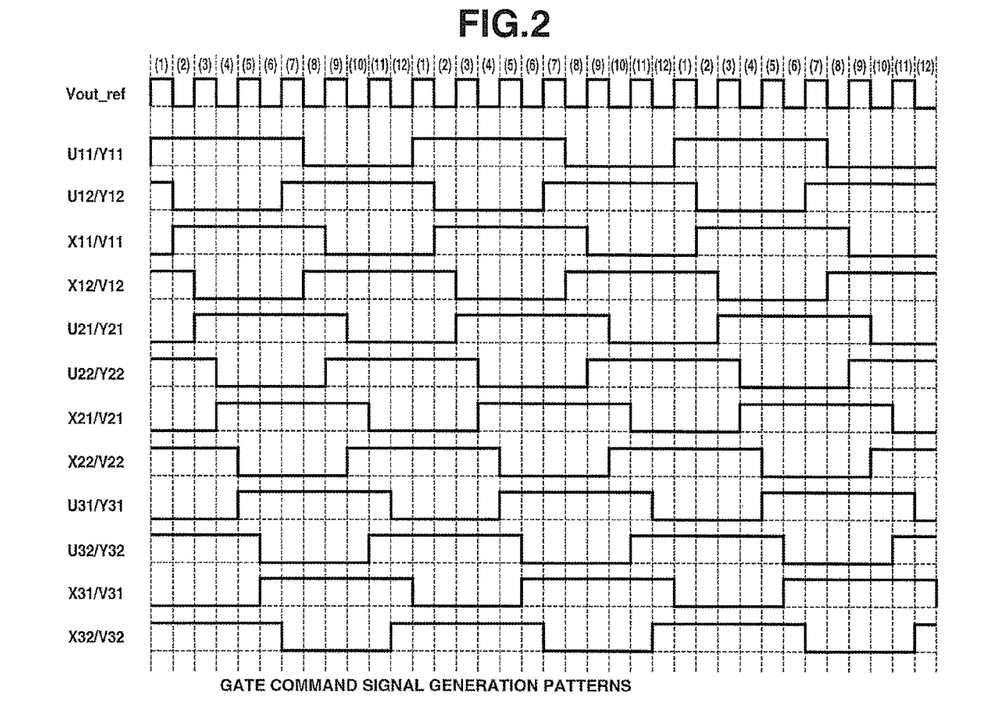
FIG. 2 is a signal waveform chart showing, as an example, gate command signal generation patterns of the practical example according to the embodiment.

A control section to control the single-phase inverter of FIG. 1 includes a gate command generating section to produce clocks or clock pulses and gate command signals as shown in gate command signal generation patterns of FIG. 2, and controls the switching devices in a manner of ON/OFF control with the produced gate command signals.

FIG. 2 shows the gate command signal generation patterns in the practical example of FIG. 1 in which the series number or the number of the series-connected components M=2, and the parallel number or the number of the parallel-connected components N=3.

The clocks are generated by using, as trigger, the turn-on and the turn-off of the output voltage command (Vout_ref) of the single-phase inverter.

A first gate command signal U11_gate/Y11_gate for each of the switching devices U11 and Y11 is a periodical signal having a cycle period equaling 12 clocks (2×(series number M)×(parallel number N)). The first gate command signal U11_gate/Y11_gate is ON for 7 clocks ((series number M)×(parallel number N)+1) and is OFF for 5 dock ((series number M)×(parallel number N)−1).

A second gate command signal X11_gate/V11_gate for each of the switching devices X11 and V11 is delayed by one clock with respect to the first gate command signal U11_gate/Y11_gate. The second gate command signal X11_gate/V11_gate has an on period equal in length to the on period of the first gate command signal and an off period equal in length to the off period of the first gate command signal.

A third gate command signal U21_gate/Y21_gate for each of the switching devices U21 and Y21 is delayed by one clock with respect to the second gate command signal X11_gate/V11_gate. The third gate command signal U21_gate/Y21_gate has an on period equal to the on period of the second gate command signal and an off period equal to the off period of the second gate command signal.

A fourth gate command signal X21_gate/V21_gate for each of the switching devices X21 and V21 is delayed by one clock with respect to the third gate command signal U21_gate/Y21_gate. The fourth gate command signal X21_gate/V21_gate has an on period equal to the on period of the third gate command signal and an off period equal to the off period of the third gate command signal.

A fifth gate command signal U31_gate/Y31_gate for each of the switching devices U31 and Y31 is delayed by one clock with respect to the fourth gate command signal X21_gate/V21_gate. The fifth gate command signal U31_gate/Y31_gate has an on period equal to the on period of the fourth gate command signal and an off period equal to the off period of the fourth gate command signal.

A sixth gate command signal X31_gate/V31_gate for each of the switching devices X31 and V31 is delayed by one clock with respect to the fifth gate command signal U31_gate/Y31_gate. The sixth gate command signal X31_gate/V31_gate has an on period equal to the on period of the fifth gate command signal and an off period equal to the off period of the fifth gate command signal.

A seventh gate command signal U12_gate/Y12_gate for each of the switching devices U12 and Y12 is delayed by one clock with respect to the sixth gate command signal X31_gate/V31_gate. The seventh gate command signal U12_gate/Y12_gate has an on period equal to the on period of the sixth gate command signal and an off period equal to the off period of the sixth gate command signal.

An eighth gate command signal X12_gate/V12_gate for each of the switching devices X12 and V12 is delayed by one clock with respect to the seventh gate command signal U12_gate/Y12_gate. The eighth gate command signal X12_gate/V12_gate has an on period equal to the on period of the seventh gate command signal and an off period equal to the off period of the seventh gate command signal.

A ninth gate command signal U22_gate/Y22_gate for each of the switching devices U22 and Y22 is delayed by one clock with respect to the eighth gate command signal X12_gate/V12_gate. The ninth gate command signal U22_gate/Y22_gate has an on period equal to the on period of the eighth gate command signal and an off period equal to the off period of the eighth gate command signal.

A tenth gate command signal X22_gate/V22_gate for each of the switching devices X22 and V22 is delayed by one clock with respect to the ninth gate command signal U22_gate/Y22_gate. The tenth gate command signal X22_gate/V22_gate has an on period equal to the on period of the ninth gate command signal and an off period equal to the off period of the ninth gate command signal.

An eleventh gate command signal U32_gate/Y32_gate for each of the switching devices U32 and Y32 is delayed by one clock with respect to the tenth gate command signal X22_gate/V22_gate. The eleventh gate command signal U32_gate/Y32_gate has an on period equal to the on period of the tenth gate command signal and an off period equal to the off period of the tenth gate command signal.

A twelfth gate command signal X32_gate/V32_gate for each of the switching devices X32 and V32 is delayed by one clock with respect to the eleventh gate command signal U32_gate/Y32_gate. The twelfth gate command signal X32_gate/V32_gate has an on period equal to the on period of the eleventh gate command signal and an off period equal to the off period of the eleventh gate command signal.

Each of the switching devices shown in FIG. 1 is controlled between ON and OFF by the repetition of the patterns (1)~(12) shown in FIG. 2 by the thus-produced gate command signals U11_gate/Y11_gate . . . X32_gate/V32_gate shown in FIG. 2.

Figure 3:
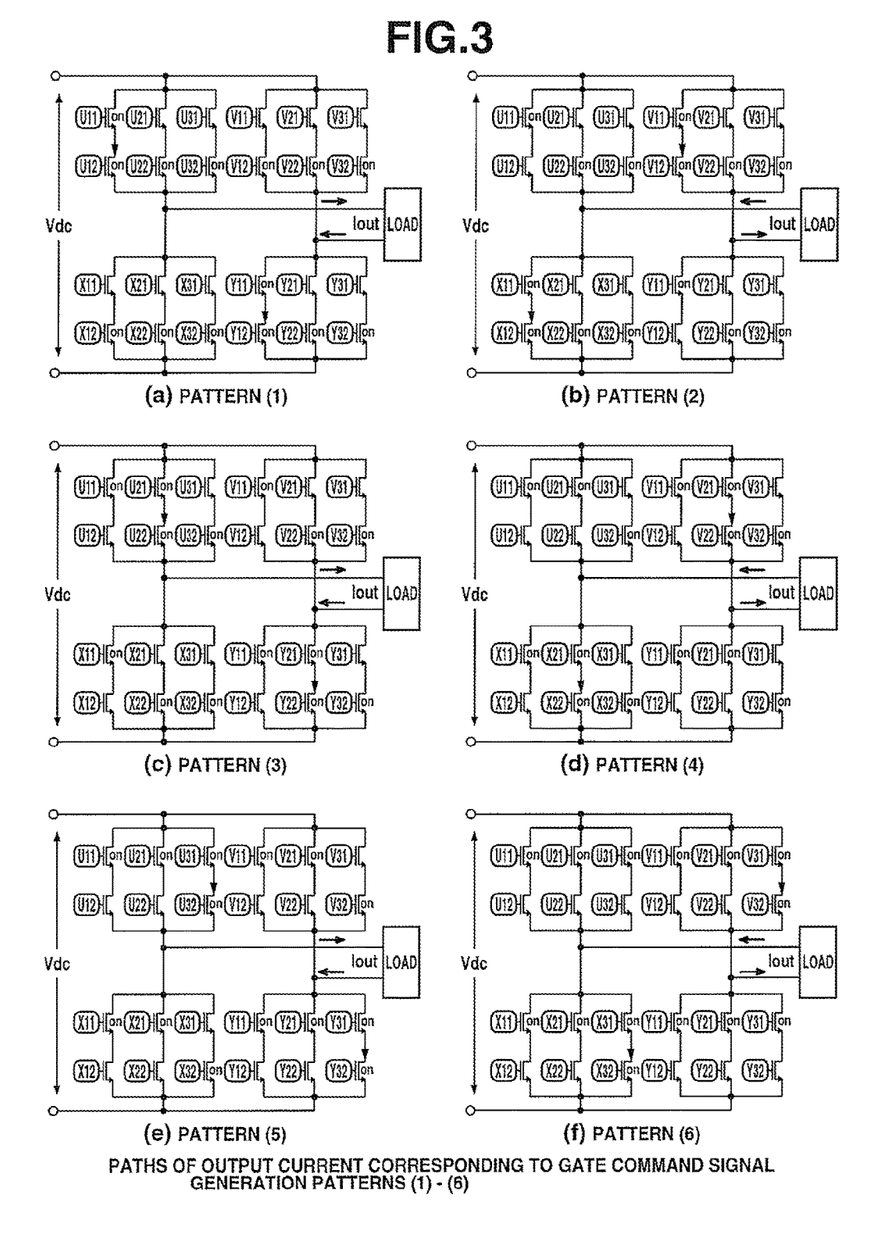
FIG. 3 is a view for illustrating on-controlled switching devices and output current path in gate command generation patterns (1)~(6) in FIG. 2.
Figure 4:
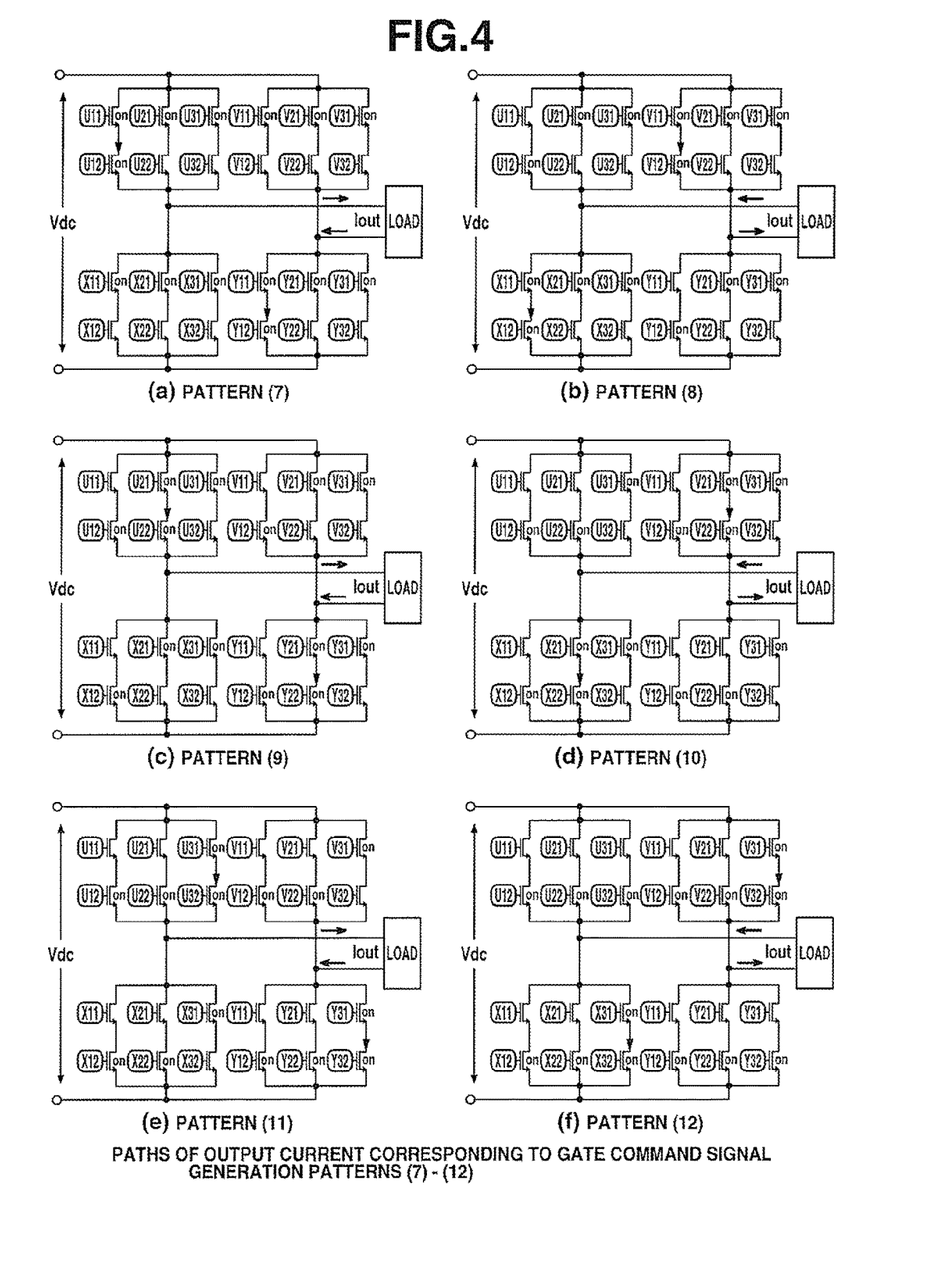
FIG. 4 is a view for illustrating the on-controlled switching devices and the output current path in gate command generation patterns (7)~(12) in FIG. 2.

FIGS. 3 and 4 show the flows of the output current when the switching devices of the switch group circuits shown in FIG. 1 are controlled ON and OFF by the gate command signal generation patterns of FIG. 2.

FIGS. 3(a)~3(f) correspond, respectively, to the patterns (1)~(6) of FIG. 2, and FIGS. 4(a)~4(f) correspond, respectively, to the patterns (7)~(12) of FIG. 2. In these figures, the switching devices controlled ON by the ON signals of the gate command are indicated by "ON", and arrows indicate the path of the output current Iout flowing through the switching devices thus turned ON and the load.

The load shown in the example of FIGS. 3 and 4 is a resonant load such as an induction heating device.

In the pattern (1) of FIG. 3(a), the switching devices U11, Y11, U12, Y12, X12, V12, U22, Y22, X22, V22, U32, Y32, X32 and V32 are turned ON, and the switching devices X11, V11, U21, Y21, X21, V21, U31, Y31, X31 and V31 are turned OFF. Therefore, the current flows through the path of U11→U12→load→Y11→Y12.

In the pattern (2) of FIG. 3(b), the switching devices U11, Y11, X11, V11, X12, V12, U22, Y22, X22, V22, U32, Y32, X32 and V32 are turned ON, and the switching devices U12, Y12, U21, Y21, X21, V21, U31, Y31, X31 and V31 are turned OFF. Therefore, the current flows through the path of V11→V12→load→X11→X12.

In the pattern (3) of FIG. 3(c), the switching devices U11, Y11, X11, V11, U21, Y21, U22, Y22, X22, V22, U32, Y32, X32 and V32 are turned ON, and the switching devices U12, Y12, X12, V12, X21, V21, U31, Y31, X31 and V31 are turned OFF. Therefore, the current flows through the path of U21→U22→load→Y21→Y22.

In the pattern (4) of FIG. 3(d), the switching devices U11, Y11, X11, V11, U21, Y21, X21, V21, X22, V22, U32, Y32, X32 and V32 are turned ON, and the switching devices U12, Y12, X12, V12, U22, Y22, U31, Y31, X31, and V31 are turned OFF. Therefore, the current flows through the path of V21→V22→load→X21→X22.

In the pattern (5) of FIG. 3(e), the switching devices U11, Y11, X11, V11, U21, Y21, X21, V21, U31, Y31, U32, Y32, X32 and V32 are turned ON, and the switching devices U12, Y12, X12, V12, U22, Y22, X22, V22, X31 and V31 are turned OFF. Therefore, the current flows through the path of U31→U32→load→Y31→Y32.

In the pattern (6) of FIG. 3(f), the switching devices U11, Y11, X11, V11, U21, Y21, X21, V21, U31, Y31, X31, V31, X32 and V32 are turned ON, and the switching devices U12, Y12, X12, V12, U22, Y22, X22, V22, U32 and Y32 are turned OFF. Therefore, the current flows through the path of V31→V32→load→X31→X32.

In the pattern (7) of FIG. 4(a), the switching devices U11, Y11, U12, Y12, X11, V11, U21, Y21, X21, V21, U31, Y31, X31 and V31 are turned ON, and the switching devices X12, V12, U22, Y22, X22, V22, U32, Y32, X32 and V32 are turned OFF. Therefore, the current flows through the path of U11→U12→load→Y11→Y12.

In the pattern (8) of FIG. 4(b), the switching devices U12, Y12, X11, V11, X12, V12, U21, Y21, X21, V21, U31, Y31, X31 and V31 are turned ON, and the switching devices U11, Y11, U22, Y22, X22, V22, U32, Y32, X32 and V32 are turned OFF. Therefore, the current flows through the path of V11→V12→load→X11→X12.

In the pattern (9) of FIG. 4(c), the switching devices U12, Y12, X12, V12, U21, Y21, U22, Y22, X21, V21, U31, Y31, X31 and V31 are turned ON, and the switching devices U11, Y11, X11, V11, X22, V22, U32, Y32, X32 and V32 are turned OFF. Therefore, the current flows through the path of U21→U22→load→Y21→Y22.

In the pattern (10) of FIG. 4(d), the switching devices U12, Y12, X12, V12, U22, Y22, X21, V21, X22, V22, U31, Y31, X31 and V31 are turned ON, and the switching devices U11, Y11, X11, V11, U21, Y21, U32, Y32, X32 and V32 are turned OFF. Therefore, the current flows through the path of V21→V22→load→X21→X22.

In the pattern (11) of FIG. 4(e), the switching devices U12, Y12, X12, V12, U22, Y22, X22, V22, U31, Y31, U32, Y32, X31 and V31 are turned ON, and the switching devices U11, Y11, X11, V11, U21, Y21, X21, V21, X32 and V32 are turned OFF. Therefore, the current flows through the path of U31→U32→load→Y31→Y32.

In the pattern (12) of FIG. 4(f), the switching devices U12, Y12, X12, V12, U22, Y22, X22, V22, U32, Y32, X31, V31, X32 and V32 are turned ON, and the switching devices U11, Y11, X11, V11, U21, Y21, X21, V21, U31 and Y31 are turned OFF. Therefore, the current flows through the path of V31→V32→load→X31→X32.

By using the patterns (1)~(12) shown in FIGS. 3 and 4, the conversion system switches the switching devices sequentially (ON, OFF control). By so doing (performing a time division operation, that is), it is possible to decrease the drive frequency of one switching device to a frequency (⅙) inversely proportional to the product (M×N) of the series number M and the parallel number N. Furthermore, the on period and the off period of each switching device are continuous for a plurality of clocks or a plurality of clock intervals. Therefore, it is possible to avoid the limitation on the output frequency by the limit of the minimum pulse width determined by the properties of the device (the output frequency of the ac/dc conversion apparatus is not limited by the properties of the switching devices).

Furthermore, the switching devices of each switch group circuit are connected in the form of a series parallel connection. Therefore, it is possible reduce the number of main circuit conductors between the dc link voltage input section Vdc and the dc input terminals of the respective switching devices of the upper and lower arms, and between the rectangular wave voltage output section Vout and the output terminals of the respective switching devices of the upper and lower arms, to a number smaller than the number of the switching devices (M×N). Because of the series parallel connection of the switching devices, the space required for disposing the main circuit conductors is not enlarged in proportion to the number of the switching devices (M×N), and it is possible to reduce the dispersion of the impedance due to the dispersion of the length of the main circuit conductors.

The series number M or the number of the switching devices connected in series in the switch group circuit of each arm of the single-phase inverter is not limited to 2, and the series number M may be equal to or greater than 3. The parallel number N or the number of the circuit components connected in parallel is not limited to 3, and the parallel number N may be equal 2 or equal to or greater than 4. In such a case, it is possible to further decrease the switching frequency.

The invention claimed is:

1. A resonant load power conversion apparatus including a single-phase inverter having a dc input side to be connected with a dc voltage source and an output side to be connected with a resonant load and outputting a rectangular wave voltage with a resonance frequency, the resonant load power conversion apparatus comprising:
   switch group circuits which are connected, respectively, with upper and lower arms of a first phase of the single-phase inverter and upper and lower arms of a second phase of the single-phase inverter, each of the switch group circuits including N series combinations, N being a number of the series combinations (N is an integer equal to or greater than 2), each of the series combinations being a series combination of M switching devices, M being a number of the switching devices (M is an integer equal to or greater than 2), the N series combinations being connected in parallel with each other by main circuit conductors; and
   a control section configured to control each of the switching devices of the switch group circuits of the single-phase inverter cyclically in an ON state for an ON period equaling (M×N+1) clocks and in an OFF state for an OFF period equaling (M×N−1) clocks in each cycle of a cycle period equaling to (2×M×N) clocks, in a switching pattern to turn on each of the series combinations in a manner of time division by 1/(M×N).

2. The resonant load power conversion apparatus as claimed in claim 1, wherein the upper arm of the first phase of the single-phase inverter includes a parallel combination of a series combination of switching devices U11 and U12, a series combination of switching devices U21 and U22 and a series combination of switching devices U31 and U32, which are connected in parallel with each other by main circuit conductors, the lower arm of the first phase of the single-phase inverter includes a parallel combination of a series combination of switching devices X11 and X12, a series combination of switching devices X21 and X22 and a series combination of switching devices X31 and X32, the series combinations of the lower arm of the first phase being connected in parallel with each other by main circuit conductors, the upper arm of the second phase of the single-phase inverter includes a parallel combination of a series combination of switching devices V11 and V12, a series combination of switching devices V21 and V22 and a series combination of switching devices V31 and V32, the series combinations of the upper arm of the second phase being connected in parallel with each other by main circuit conductors, the lower arm of the second phase of the single-phase inverter includes a parallel combination of a series combination of switching devices Y11 and Y12, a series combination of switching devices Y21 and Y22 and a series combination of switching devices Y31 and Y32, the series combinations of the lower arm of the second phase being connected in parallel with each other by main circuit conductors, the control section includes a gate command generating section configured to generate, clocks using, as trigger, on and off changes of an output voltage command of the single-phase inverter, a first gate command signal for the switching devices U11 and Y11, the first gate command signal being periodic with a cycle period of a number of clocks equaling 2×2 (series number M)×3 (parallel number N), being set ON during an ON period of a number of clocks equaling {2 (series number M)×3 (parallel number N)}+1 and being set OFF during an OFF period of a number of clocks equaling {2 (series number M)×3 (parallel number N)}−1, a second gate command signal for the switching devices X11 and V11 delayed by one clock with respect to the first gate command signal for the switching devices U11 and Y11, and set to have an ON period equa to the ON period of the first gate command signal for the switching devices U11 and Y11, and an OFF period equal to the OFF period of the first gate command signal for the switching devices U11 and Y11, a third gate command signal for the switching devices U21 and Y21 delayed by one clock with respect to the second gate command signal for the switching devices X11 and V11, and set to have an ON period equal to the ON period of the second gate command signal for the switching devices X11 and V11, and an OFF period equal to the OFF period of the second gate command signal for the switching devices X11 and V11, a fourth gate command signal for the switching devices X21 and V21 delayed by one clock with respect to the third gate command signal for the switching devices U21 and Y21, and set to have an ON period equal to the ON period of the third gate command signal for the switching devices U21 and Y21, and an OFF period equal to the OFF period of the third gate command signal for the switching devices U21 and Y21, a fifth gate command signal for the switching devices U31 and Y31 delayed by one clock with respect to the fourth gate command signal for the switching devices X21 and V21, and set to have an ON period equal to the ON period of the fourth gate command signal for the switching devices X21 and V21, and an OFF period equal to the OFF period of the fourth gate command signal for the switching devices X21 and V21, a sixth gate command signal for the switching devices X31 and V31 delayed by one clock with respect to the fifth gate command signal for the switching devices U31 and Y31, and set to have an ON period equal to the ON period of the fifth gate command signal for the switching devices U31 and Y31, and an OFF period equal to the OFF period of the fifth gate command signal for the switching devices U31 and Y31, a seventh gate command signal for the switching devices U12 and Y12 delayed by one clock with respect to the sixth gate command signal for the switching devices X31 and V31, and set to have an ON period equal to the ON period of the sixth gate command signal for the switching devices X31 and V31, and an OFF period equal to the OFF period of the sixth gate command signal for the switching devices X31 and V31, an eighth gate command signal for the switching devices X12 and V12 delayed by one clock with respect to the seventh gate command signal for the switching devices U12 and Y12, and set to have an ON period equal to the ON period of the seventh gate command signal for the switching devices U12 and Y12, and an OFF period equal to the OFF period of the seventh gate command signal for the switching devices U12 and Y12, a ninth gate command signal for the switching devices U22 and Y22 delayed by one clock with respect to the eighth gate command signal for the switching devices X12 and V12, and set to have an ON period equal to the ON period of the eight gate command signal for the switching devices X12 and V12, and an OFF period equal to the OFF period of the eighth gate command signal for the switching devices X12 and V12, a tenth gate command signal for the switching device X22 and V22 delayed by one clock with respect to the ninth gate command signal for the switching devices U22 and Y22, and set to have an ON period equal to the ON period of the ninth gate command signal for the switching devices U22 and Y22, and an OFF period equal to the OFF period of the ninth gate command signal for the switching devices U22 and Y22, an eleventh gate command signal for the switching device U32 and Y32 delayed by one clock with respect to the tenth gate command signal for the switching devices X22 and V22, and set to have an ON period equal to the ON period of the tenth gate command signal for the switching devices X22 and V22 and an OFF period equal to the OFF period of the tenth gate command signal for the switching devices X22 and V22, and a twelfth gate command signal for the switching device X32 and V32 delayed by one clock with respect to the eleventh gate command signal for the switching devices U32 and Y32, and set to have an ON period equal to the ON period of the eleventh gate command signal for the switching devices U32 and Y32 and an OFF period equal to the OFF period of the eleventh gate command signal for the switching devices U32 and Y32, the control section being configured to control the switching devices with the gate command signals, respectively, between ON and OFF.

3. A time division operating method for a resonant load power conversion apparatus including a single-phase inverter having a dc input side connected with a dc voltage source and an output side connected with a resonant load and outputting a rectangular wave voltage with a resonance frequency, the resonant load power conversion apparatus comprising switch group circuits which are connected, respectively, with upper and lower arms of a first phase of the single-phase inverter and upper and lower arms of a second phase of the single-phase inverter, each of the switch group circuits including N series combinations, N being a number of the series combinations (N is an integer equal to or greater than 2), each of the series combinations being a series combination of M switching devices, M being a number of the switching devices (M is an integer equal to or greater than 2), the N series combinations being connected in parallel with each other by main circuit conductors;

the time division operating method comprising a control step of controlling each of the switching devices of the switch group circuits of the single-phase inverter cyclically in an ON state for an ON period equaling (M×N+1) clocks and in an OFF state for an OFF period equaling (M×N−1) clocks in each cycle of a cycle period equaling to (2×M×N) clocks, in a switching pattern to turn on each of the series combinations in a manner of time division by 1/(M×N).

4. The time division operating method for the resonant load power conversion apparatus as claimed in claim 3, wherein the upper arm of the first phase of the single-phase inverter includes a parallel combination of a series combination of switching devices U11 and U12, a series combination of switching devices U21 and U22 and a series combination of switching devices U31 and U32, which are connected in parallel with each other by main circuit conductors, the lower arm of the first phase of the single-phase inverter includes a parallel combination of a series combination of switching devices X11 and X12, a series combination of switching devices X21 and X22 and a series combination of switching devices X31 and X32, the series combinations of the lower arm of the first phase being connected in parallel with each other by main circuit conductors, the upper arm of the second phase of the single-phase inverter includes a parallel combination of a series combination of switching devices V11 and V12, a series combination of switching devices V21 and V22 and a series combination of switching devices V31 and V32, the series combinations of the upper arm of the second phase being connected in parallel with each other by main circuit conductors, the lower arm of the second phase of the single-phase inverter includes a parallel combination of a series combination of switching devices Y11 and Y12, a series combination of switching devices Y21 and Y22 and a series combination of switching devices Y31 and Y32, the series combinations of the lower arm of the second phase being connected in parallel with each other by main circuit conductors, the control step comprises a gate command generating step of generating, clocks using, as trigger, on and off changes of an output voltage command of the single-phase inverter, a first gate command signal for the switching devices U11 and Y11, the first gate command signal being periodic with a cycle period of a number of clocks equaling 2×2 (series number M)×3 (parallel number N), being set ON during an ON period of a number of clocks equaling {2 (series number M)×3 (parallel number N)}+1 and being set OFF during an OFF period of a number of clocks equaling {2 (series number M)×3 (parallel number N)}−1, a second gate command signal for the switching devices X11 and V11 delayed by one clock with respect to the first gate command signal for the switching devices U11 and Y11, and set to have an ON period equal to the ON period of the first gate command signal for the switching devices U11 and Y11, and an OFF period equal to the OFF period of the first gate command signal for the switching devices U11 and Y11, a third gate command signal for the switching devices U21 and Y21 delayed by one clock with respect to the second gate command signal for the switching devices X11 and V11, and set to have an ON period equal to the ON period of the second gate command signal for the switching devices X11 and V11, and an OFF period equal to the OFF period of the second gate command signal for the switching devices X11 and V11, a fourth gate command signal for the switching devices X21 and V21 delayed by one clock with respect to the third gate command signal for the switching devices U21 and Y21, and set to have an ON period equal to the ON period of the third gate command signal for the switching devices U21 and Y21, and an OFF period equal to the OFF period of the third gate command signal for the switching devices U21 and Y21, a fifth gate command signal for the switching devices U31 and Y31 delayed by one clock with respect to the fourth gate command signal for the switching devices X21 and V21, and set to have an ON period equal to the ON period of the fourth gate command signal for the switching devices X21 and V21, and an OFF period equal to the OFF period of the fourth gate command signal for the switching devices X21 and V21, a sixth gate command signal for the switching devices X31 and V31 delayed by one clock with respect to the fifth gate command signal for the switching devices U31 and Y31, and set to have an ON period equal to the ON period of the fifth gate command signal for the switching devices U31 and Y31, and an OFF period equal to the OFF period of the fifth gate command signal for the switching devices U31 and Y31, a seventh gate command signal for the switching devices U12 and Y12 delayed by one clock with respect to the sixth gate command signal for the switching devices X31 and V31, and set to have an ON period equal to the ON period of the sixth gate command signal for the switching devices X31 and V31, and an OFF period equal to the OFF period of the sixth gate command signal for the switching devices X31 and V31, an eight gate command signal for the switching devices X12 and V12 delayed by one clock with respect to the seventh gate command signal for the switching devices U12 and Y12, and set to have an ON period equal to the ON period of the seventh gate command signal for the switching devices U12 and Y12, and an OFF period equal to the OFF period of the seventh gate command signal for the switching devices U12 and Y12, a ninth gate command signal for the switching devices U22 and Y22 delayed by one clock with respect to the eight gate command signal for the switching devices X12 and V12, and set to have an ON period equal to the ON period of the eight gate command signal for the switching devices X12 and V12, and an OFF period equal to the OFF period of the eighth gate command signal for the switching devices X12 and V12, a tenth gate command signal for the switching device X22 and V22 delayed by one clock with respect to the ninth gate command signal for the switching devices U22 and Y22, and set to have an ON period equal to the ON period of the ninth gate command signal for the switching devices U22 and Y22, and an OFF period equal to the OFF period of the ninth gate command signal for the switching devices U22 and Y22, an eleventh gate command signal for the switching device U32 and Y32 delayed by one clock with respect to the tenth gate command signal for the switching devices X22 and V22, and set to have an ON period equal to the ON period of the tenth gate command signal for the switching devices X22 and V22 and an OFF period equal to the OFF period of the tenth gate command signal for the switching devices X22 and V22, and a twelfth gate command signal for the switching device X32 and V32 delayed by one clock with respect to the eleventh gate command signal for the switching devices U32 and Y32, and set to have an ON period equal to the eleventh gate command signal for the ON period of the switching devices U32 and Y32 and an OFF period equal to the OFF period of the eleventh gate command signal for the switching devices U32 and Y32, the switching devices being controlled between ON and OFF, with the gate command signals, respectively.

5. The resonant load power conversion apparatus as claimed in claim 1, wherein the control section is configured to control the switching devices cyclically by producing periodic on-off control signals formed equally in a periodic common waveform having an ON period and an OFF period in each cycle of a cycle period, the ON period being equal to a half of the cycle period plus one clock interval which is a time length resulting from division of the cycle period by 2×M×N, the OFF period being equal to the half of the cycle period minus one clock interval, the periodic on-off control signal for a given device which is one of the switching devices in the lower arm of the first phase of the single-phase inverter being delayed by one clock interval with respect to the periodic on-off control signal for a first corresponding device which is the switching device in the upper arm of the first phase corresponding to the given device in the lower arm of the first phase, being delayed by one clock interval with respect to the periodic on-off control signal for a second corresponding device which is the switching device in the lower arm of the second phase corresponding to the given device and being synchronous with the periodic on-off control signal for a third corresponding device which is the switching device in the upper arm of the second phase corresponding to the given device.

6. The time division operating method for the resonant load power conversion apparatus as claimed in claim 3, wherein the control step includes an operation of controlling the switching devices cyclically by producing periodic on-off control signals formed equally in a periodic common waveform having an ON period and an OFF period in each cycle of a cycle period, the ON period being equal to a half of the cycle period plus one clock interval which is a time length resulting from division of the cycle period by 2×M×N, the OFF period being equal to the half of the cycle period minus one clock interval, the periodic on-off control signal for a given device which is one of the switching devices in the lower arm of the first phase of the single-phase inverter being delayed by one clock interval with respect to the periodic on-off control signal for a first corresponding device which is the switching device in the upper arm of the first phase corresponding to the given device in the lower arm of the first phase, being delayed by one clock interval with respect to the periodic on-off control signal for a second corresponding device which is the switching device in the lower arm of the second phase corresponding to the given device and being synchronous with the periodic on-off control signal for a third corresponding device which is the switching device in the upper arm of the second phase corresponding to the given device.

* * * * *